United States Patent [19]

Sanders

[11] 3,862,002
[45] Jan. 21, 1975

[54] PRODUCTION OF PHYSIOLOGICALLY ACTIVE PLACENTAL SUBSTANCES
[75] Inventor: George R. Sanders, El Cerrito, Calif.
[73] Assignee: Sanfar Laboratories, Inc., El Cerrito, Calif.
[22] Filed: July 3, 1967
[21] Appl. No.: 650,822

Related U.S. Application Data
[63] Continuation-in-part of Ser. No. 193,152, May 8, 1962, abandoned.

[52] U.S. Cl..................... 195/1.7, 424/95, 424/105, 424/179, 424/180
[51] Int. Cl.... C12k 9/00, A61k 17/00, A61k 17/08
[58] Field of Search........................ 424/95; 195/1.7

[56] References Cited
UNITED STATES PATENTS

| | | | |
|---|---|---|---|
| 2,658,021 | 11/1953 | Earle................................... | 195/104 |
| 3,073,746 | 1/1963 | Thompson.......................... | 195/104 |
| 3,170,839 | 2/1965 | On...................................... | 195/1.7 |

OTHER PUBLICATIONS
Jones, Johns Hopkins Hosp. Bull., Vol. 72, 1943, pp. 26–38.
Gey, Science, Vol. 88, No. 2283, 1938, pp. 306–307.
Thiede, PSEMB, Vol. 107, No. 3, July 1961, pp. 565–569.

Primary Examiner—Stanley J. Friedman
Assistant Examiner—A. P. Fagelson
Attorney, Agent, or Firm—Harris Zimmerman

[57] ABSTRACT

A system for the production of physiologically active placental substances in which viable placental tissue is placed in a circulating culture medium. The pH and temperature conditions are controlled and are continued for a sufficient period of time for the desired substance to be produced in the medium. The processed culture medium is then removed from the tissue, and the desired substances withdrawn, separated or otherwise recovered.

4 Claims, 3 Drawing Figures

PATENTED JAN 21 1975

3,862,002

INVENTOR
GEORGE R. SANDERS
BY
Gardner & Zimmerman
ATTORNEYS

PRODUCTION OF PHYSIOLOGICALLY ACTIVE PLACENTAL SUBSTANCES

CROSS-REFERENCE TO RELATED APPLICATION

This application is a continuation-in-part of my prior application, now abandoned, filed May 8, 1962 under Ser. No. 193,152, and having the same title as this case.

BACKGROUND OF THE INVENTION

The placenta is the internal secretory organ which comes into being during the normal course of pregnancy following disposition of a fertilized ovum. It is differentiated from the cell mass at the morula stage of gestation, during the course of ovum transport through the Fallopian tube into the uterus. The rapidly developing blastocyst, as it is now termed, is nidated generally in the upper part of the uterus; this phenomena is known as implantation. This cytological differentiation is unique and significant because it is devoid of any neurological influence, thereby being characterized as totipotential, that is, capable of all function without being differentiated into anatomical specialization. The neurological system arises from the ectodermal germ layer of the embryo and influences and coordinates its growth and development, as it is the first specialized structure to develop. Therefore, the chorion is intrinsically independent of the embryo. Histologically, the chorion is characterized by two cell layers, the cytotrophoblast and the syncitial trophoblast respectively. The cytotrophoblast cells (cells of Langhans) are large and polynucleated with well defined cytoplasm and cell membrane. The syncitial trophoblast is a multi nucleated plasmodium without any discernable cell membrane. As soon as implantation is complete, the trophoblast erodes and penetrates the decidua in branched tree like projections termed villi forming large spaces which are filled with maternal blood, and eventually the villi are invaded with mesoderm carrying foetal blood vessels. Thereby foetal and maternal blood vessels are brought close together across permeable membranes so as to provide for the nutrition of the developing foetus and to provide for the removal of metabolic products.

Numerous studies have shown that the placenta secretes a large number of physiologically active materials including hormones such as oestrogen, progestrone, adrenocorticotrophic hormone, thyrotropin, gonadotropin, samatotropin, and adreno-like hormones. Other substances are produced including enzymes, growth promoting factors, intermediate metabolities and others which should be of substantial value as curative agents or for research purposes in the event that reliable methods could be developed for the production and isolation thereof. The placenta, in all probability, produces life giving and sustaining substances which might also become available. Just recently, for example, there have been reported the detection of a placental substance having the capability of maintaining organisms in a juvenile state and might therefore be effective in delaying aging or slowing other deteriorative processes. Indeed, in biological terms, placental tissue might be considered to be composed to totipotent cells.

SUMMARY OF THE INVENTION

In accordance with my invention in vitro tissue culture techniques and methods are provided by which tissues of the placenta may be viably maintained with the consequent production of fluid media or extracts containing significant quantities of physiologically active substances of the character described above. Methods are also provided for the harvesting, isolation, purification and other operations necessary for the preparation of materials suitable for pharmaceutical purposes. The method may be operated in either batch or in a continuous fashion.

Still another object of my invention is to provide methods and techniques whereby chorionic placental tissue may be cultured in a viable condition to produce significant quantities of physiologically active substances in a fluid medium and whereby individual component substances may be recovered from said medium.

DESCRIPTION OF THE PREFERRED EMBODIMENTS

In brief, the techniques and method of the invention involves the collection of suitable placental tissue and preparation of the tissue for culture by alternative methods to yield fluid media containing a large variety of physiologically active substances. The fluid media are then subjected to treatment whereby isolated and purified substances suitable for pharmaceutical and other purposes are produced.

More particularly, the placental tissue required in the tissue culture operation of the invention may be collected by the attending physician following delivery of the foetus, preferably in cases having an uncomplicated pregnancy or delivery which might cause abnormalities or otherwise militate against obtaining healthy viable tissue. The physician should apply only slight tension to the umbilical cord to assist expulsion leaving the main forces required therefor to be supplied by normal uterine contractions. In this manner the placenta is caused to part and separate from the endometrium with the least possible violence which might effect the cotyledons and other cellular structures or cause other undesirable damage. The delivered placenta should immediately be placed in a suitable sterile medium to preserve the tissue in the best possible condition during transport. A suitable quantity, e.g., 1 liter of a sterile balanced, i.e., isotonic salt solution, such as Hank's solution containing 2 gm/liter of glucose, 10 ml of sodium citrate as an anti-coagulant, and a disinfectant such as a broad spectrum antibiotic in appropriate amounts, may be used. Penicillin, streptomycin, tetracyclines and the like are suitable for this purpose. A typical mixture might include 0.5 mg penicillin and 1.0 mg streptomycin/liter. The immersed placenta may then be transported and placed in an incubator at a temperature of about 37.5° ± 0.5° C as soon as possible, although no deleterious effects are noted where this procedure is delayed for a reasonably short period of time.

In accordance with one tissue culture procedure, within a period of preferably less than about 6 hours of delivery, the trophoblastic tissue iss dissected from the basal membrane of the chorion under strict aseptic conditions while constantly immersed in a balanced salt solution of the character described to minimize any deterioration of the tissue. The dissected trophoblastic tissue is cut into conveniently sized strips, e.g., 2 inches wise and 6 inches long for disposition in the tissue culture apparatus, and during the aforesaid period of immersion and cutting, the temperature of the placental cells should be maintained at about 37.5° C so as to prevent thermal shock to the tissues.

Figures 1, 2:
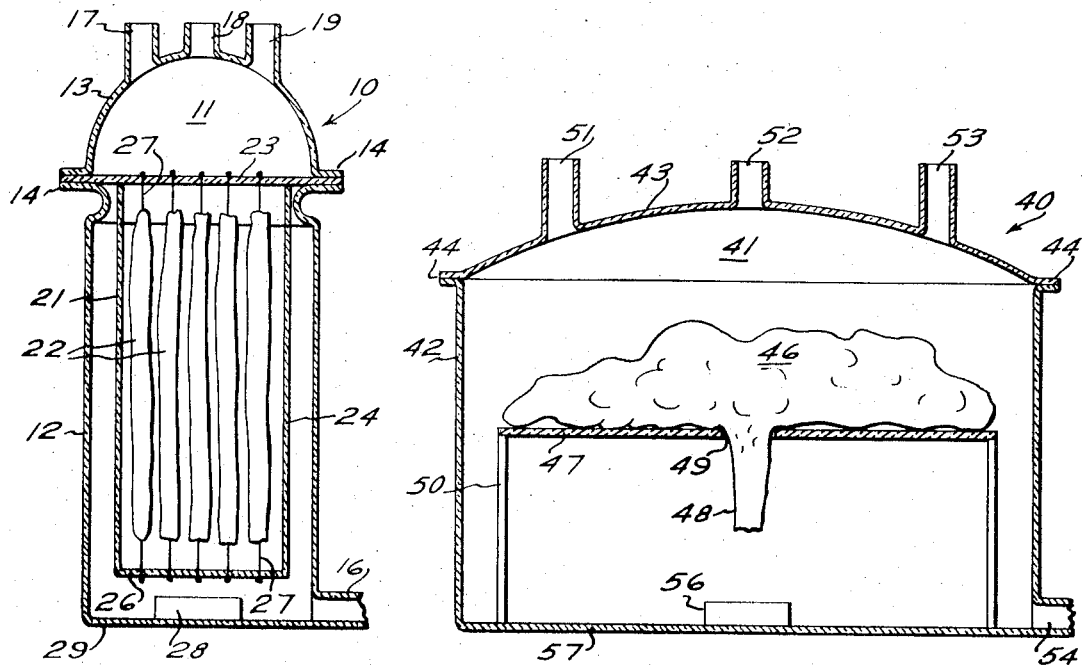
FIG. 1 is a vertical cross-sectional view of a first tissue culture flask apparatus arranged for operation in accordance with one procedure of the invention.
FIG. 2 is a vertical cross-sectional view of a second tissue culture flask apparatus arranged in accordance with another procedure of the invention.

A culture flask apparatus 10 suitable for the culture of such trophoblastic tissue strips is illustrated in FIG. 1 of the drawing wherein a closed chamber 11 is defined by a flask body 12 formed, for example, of glass, and a cap 13 joined as by means of a flanged ground joint 14 or by an equivalent juncture. The lower portion of body 12 is provided with an exit orifice 16 provided with valve means (not shown) by which fluid may be drawn from the chamber 11 and cap 13 is provided with three ports 17, 18 and 19 which are employed as described hereinafter. Means is provided, such as a frame 21, for suspending tissue strips 22 prepared as described above freely within chamber 11. More specifically, frame 21 may include a crosspiece 23 supported by cap 13 with frame side pieces 24 depending downwardly within body 12 with the lower crosspiece 26 thereof being disposed near the lower portion of said chamber 11. Sutures 27 attached to each end of strips 22 during preparation may then support such strips in parallel spaced relation, longitudinally within said chamber. A magnetic stirring bar 28 is disposed upon the bottom 29 of body 12 to provide means for circulating a fluid medium within said chamber 11, which bar 28 is driven by a conventional magnetic motor means (not shown) located exteriorally of said bottom 29. A flask volume of the order of 1,200 to 1,500 ml is adequate for the culture of tissue from a placenta of normal full size; however it will be appreciated that additional tissue from several placentas or subdivided tissue from proliferated material may be accommodated in larger flasks if desired. Of course, usual aseptic practice must be observed in assembling and arranging the tissue within the flask as well as during all other phases of the operations disclosed herein.

Alternatively, the placental tissue may be prepared by leaving the trophoblast intact upon the base membrane of the chorion, however, removing all excess amniotic tissue. The umbilical arteries are canulized and the trophoblast is carefully perfused with balanced salt solution, i.e., Hank's soltuion containing 10 gm/liter of sodium citrate to prevent coagulation of the blood. In perfusing the placenta, a manometer should be attached to the perfusing syringe so that a pressure of about 50 mm Hg is not exceeded. This will prevent the constriction and subsequent rupture of the small capillaries. This operation must be accomplished as soon as possible after delivery to avoid coagulation and to assure removal of as much blood as possible from the trophoblast tissue and to disturb the anatomic geometry as little as possible. The umbilical cord is cut to leave a protruding length of about 3 or 4 inches.

A second type of tissue culture flask apparatus 40 illustrated in FIG. 2 of the drawing is suitable for the culture of such a prepared intact placenta. The flask 40 defines a closed chamber 41 having a relatively large diameter to height ratio to accommodate the spread out area of a placenta and defined by a fask body 42 joined to a dome-like cap 43 as by means of a flanged ground joint 44. A whole intact placenta 46 is disposed within chamber 41 horizontally upon a glass support plate 47 with the umbilical cord 48 depending downwardly through an orifice 49 formed centrally in said plate. Plate 47 is supported in turn by legs 50 or by equivalent means. Ports 51, 52 and 53 are provided in cap 43 for purposes discussed more fully hereinafter, and a drain orifice 54 provided with a valve means (not shown) is provided in the lower portion of flask body 42. A magnetic stirring bar 56 is disposed upon the flask bottom 57 and is driven as above in order to recirculate fluid media within the chamber and through the placenta 46. A flask volume of the order of 1,200 ml is adequate for a single placenta, however, several support plates might be arranged vertically in a taller flask particularly if the fluid recirculating means is modified to assure adequate recirculation of the fluid media from top to bototm of the flask and to assure adequate contact with each intact placenta. When arranged as indicated in the foregoing the fluid medium within the chamber is caused to perfuse the supported placenta and diffuse slowly through the blood vessels so as to maintain viability and remove metabolic products including the desired product materials. Normal blood circulation is simulated in this manner.

Figure 3:
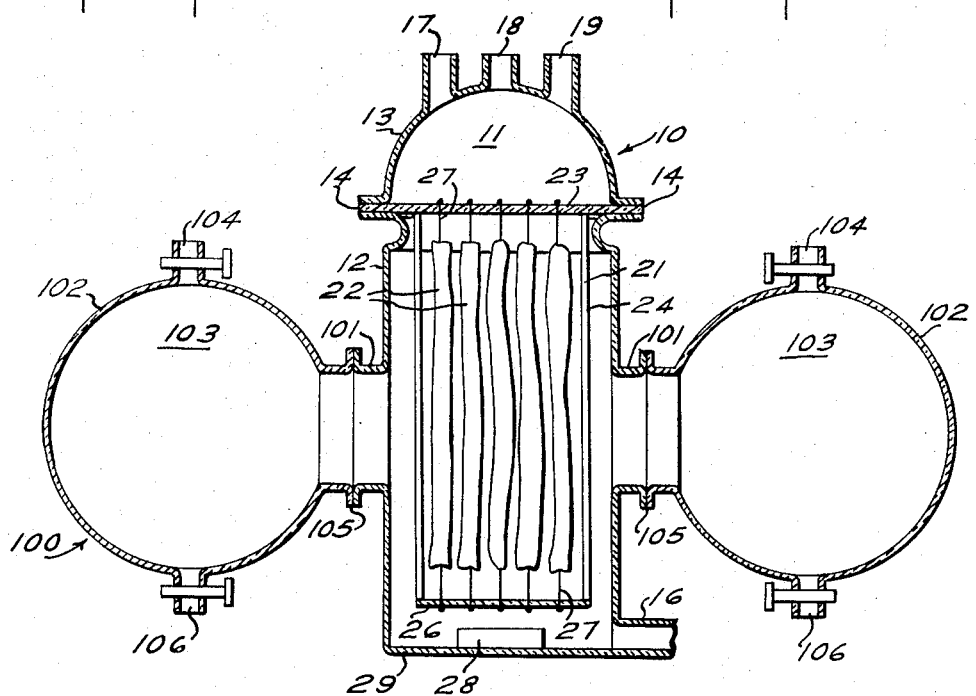
FIG. 3 is a vertical cross-sectional view of a third tissue culture flask apparatus adapted for the dialytic removal of metabolic products.

A third type of tissue culture flask apparatus 100 illustrated in FIG. 3 of the drawing is suitable for the culture of tissue strips of the character described above but could be adapted with an appropriate support to be used similarly with an intact placenta. The third type can also be considered to be an apparatus similar to that in FIG. 1 modified by the addition of dialysis means wherefore similar reference characters refer to similar components in FIGS. 1 and 3. Flanged orifice fittings 101 are provided in the body 12 of flask 10 whereby bulbs 102 may be attached to fittings 101 by means of flanged joints 105. Chambers 103 in said bulbs respectively are separated from chamber 11 by disposing semi-permeable membranes across the orifice in flanged joints 105 to permit the exchange of metabolic products and/or nutrients and/or pH adjusting materials by dialysis processes to solutions or their dialysis media disposed therein. Suitable membranes may comprise reconstituted cellulose such as cellophane and may be of either a selective or unselective nature. Inlet stopcock 104 and outlet stopcock 106, respectively, are provided for introducing solutions appropriate for the particular dialysis operation desires. Of course, chamber 11 is provided with an appropriate culture medium as disclosed hereinafter.

Placenta tissue in any of the foregoing operations is maintained at all times in the aforesaid balanced salt solution. However, immediately upon introduction of either the tissue strips or intact placenta, the tissue is immersed in the selected culture media which is disposed in said chambers and in either case is maintained for incubation at a temperature of about 37.5° C to avoid thermal shock to the tissue. An adequate volume of medium, e.g., 1,000–1,300 ml. to adequately cover the tissue, is employed, and the stirring apparatus or other suitable fluid media circulating means is actuated to provide constant circulation.

A suitable culture medium comprises Eagel's defined media supplemented by 5 ml/liter of human cord serum, 5 ml/liter of human amniotic fluid, 5 percent human blood plasma and 500 mg/liter of Vitamin E (alpha tocopherol acetate). Another suitable culture medium is Eagel's medium supplemented by lactalbumin hydrolysate, yeast extract and 6 percent human blood plasma. Antibiotics such as the broad spectrum materials mentioned above are added in appropriate quantities to prevent infection and maintain an aseptic environment. Eagel's medium, as the term is used herein, refers to a commercially available tissue culture media supplied by Difco Laboratories of Detroit, Michigan, and generally includes the essential amino acids, vitamins, intermediate metabolites and minerals for the nutrition of the tissue culture.

With any of the foregoing arrangements there is a 3 to 5 day lag in metabolic activity and proliferation due to preparation trauma. As the cells begin to proliferate and normal metabolism is reestablished, lactic acid production rises with a consequent lowering in the pH of the culture medium which would produce undesirable effects or even kill the culture if allowed to proceed uncontrolled. The pH of the medium should be maintained in the general range of 7.2 to 7.8 wherein the metabolic activity of the cells is adequate, and toxicity is avoided. To assist in determining the pH of the medium, appropriate pH electrodes may be inserted into one of the aforesaid parts in the cap of any of flask apparatus, and external indicating recorders be employed therewith. Automatic equipment might be employed to introduce suitable reagents or the manipulation may be performed manually. Sodium bicarbonate solution or crystalline sodium bicarbonate may be introduced by either method to regulate the pH within said range. Glutamine also may be added at predetermined intervals to regulate the pH. A phosphate buffer can also be used to control the ph without deleterious effects. Moreover, some selective removal process such as dialysis or adsorption could be employed to control the pH and/or remove excess lactic acid or other metabolites. It will be understood, however, that if the pH of the medium rises above the desired limits, the pH should be reduced such as by introducing sterile $CO_2$ or sterile $CO_2$ mixed with sterile oxygen to the solution. The third culture flask apparatus described above may advantageously be employed for this purpose by introducing, e.g., an isotonic salt solution or Eagel's media in one or both of said bulbs whereby acid components and other low molecular weight toxic metabolites could be exchanged with the culture medium across the membrane. The composition of Eagel's defined media is as follows.

TABLE

Components of Eagel's chemically defined tissue culture media

| Component | Concentration | |
|---|---|---|
| | mg/l | milli moles |
| L-arginine | 17.4 | 0.1 |
| L-cystine | 6.0 | 0.05 |
| L-Histidine | 3.2 | 0.02 |
| L-Isoleucine | 26.2 | 0.2 |
| L-Leucine | 13.1 | 0.1 |
| L-Lysine | 18.2 | 0.1 |
| L-Methionine | 7.5 | 0.05 |
| L-Phenylalanine | 8.3 | 0.05 |
| L-Threonine | 11.9 | 0.1 |
| L-Tryptophane | 2.0 | 0.01 |
| L-Tyrosine | 18.0 | 0.1 |
| L-Valine | 11.7 | 0.1 |
| L-Glutamine | 146.0 | 1.0 |
| Choline | 1.0 | |
| Nicotinic acid | 1.0 | |
| Pantothenic acid | 1.0 | |
| Pyridoxal | 1.0 | |
| Ribofavin | 0.1 | |
| Thiamine | 1.0 | |
| Inositol | 1.0 | |
| Biotin | 1.0 | |
| Folic acid | 1.0 | |
| Glucose | 2000 | |
| NaCl | 8000 | |
| KCl | 400 | |
| $CaCl_2$ | 140 | |
| $MgSO_4.7H_2O$ | 100 | |
| $MgCl_2.6H_2O$ | 100 | |
| $Na_2HPO_4.2H_2O$ | 60 | |
| $KH_2PO_4$ | 60 | |
| $NaHCO_3$ | 350 | |
| Phenol Red | 20.0 | |
| Penicillin | 0.50 | |

The various types of apparatus described in the foregoing could be operated in a continuous fashion once the desired product level reaches a suitable limit such as by feeding in fresh culture medium and withdrawing, i.e., harvesting the culture medium containing the desired materials. However, the flask apparatus is usually operated in a semicontinuous fashion by harvesting the processed culture medium through the drain orifice at intervals and replacing with fresh media through one of said ports.

For example, chorionic gonadatropin can be prepared from a processed or enriched culture medium when the level of such hormone rises to suitable levels as determined by an appropriate test such as the standard biological assay using uterine hyperemia as an end point. Details of such test are disclosed in an article entitled "The Rapid Rat Test for Pregnancy" by Riley, Smith and Brown, Journal of Clinical Endocrinology, Vol. 8, Page 233, 1948. For convenience, harvesting may be done in a sterile operating room or the equivalent, maintained at a temperature of about 37.5° C. The culture media is gently drawn off with a sterile aspirator to avoid any undue disturbance of the tissue and is immediately replaced with fresh culture media prewarmed to about 37.5° C with similar precautions. For this purpose, the medium may be introduced through a tube inserted near the side of the culture flask. Sterile air is circulated in the flasks as by means of a clip tube inserted through one of said ports.

When optimum conditions indicated above are employed, the placental tissue proliferates at a logarithmic rate in a three-dimensional geometry. Among the useful substances secreted or excreted are the following: chorionic gonadotropin; sex steroids such as estradiol, estrone, estriol, progesterone; corticotropins; cortico steriods; growth hormones; enzymes such as phosphatase ribonuclease, and cholinesterase; and other unknown or undiscovered metabolites of physiological significance. In a typical flask operation chorionic gonadotropin is produced at a typical rate of 3.5 to 4.0 gms per three day period and assays in the final product as 8,500 international units per milligram. Other components of this character have not been discovered or characterized with exactitude as yet. It should be noted that chorionic gonadotropin is a sensitive and labile glycoprotein and hydrolyzes easily in certain media, wherefor it is necessary to conduct procedures at about 5° C to avoid undue loss from denaturation.

Chorionic gonadotropin is isolated from single or combined batches of the harvested culture medium and purified in accordance with the following general and specifically exemplary procedure.

The procedure is preferably conducted while maintaining the temperature of the medium at about 5° C as in a cold box to avoid damage to glycoprotein (H.C.G.) during processing.

1. Acetic acid (Glacial) or equivalent carboxylic acid is added to the harvested medium to adjust the acidity to about pH 3.5 and the acidified medium is stored at about 4° C for an appropriate period of time, e.g., 48 hours to precipitate the glycoprotein (H.C.G.) therefrom.

2. The precipitated H.C.G. is then filtered from the medium utilizing activated alumina and a filter aid such as diatomaceous earth (Celite). For a flask of the above described volume a 15 cm Buchner funnel and a 2 liter filter flask may be used. A suitable filter pad may be provided by disposing an 11 cm glass filter web thereon, covering the web with filter paper and carefully seating using wash water. A slurry of the filter aid, e.g., 125 ml of Celite is then poured evenly over the filter paper covered with a 1 cm layer of water and vacuum is carefully applied to provide a uniform bed on the filter paper. A piece of filter paper may be placed in the center to provide a pouring pad to avoid damage to the filter bed. All wash effluent is then discarded and rinsed from the filter flask.

In order to recover the gonadotropic fraction from the harvested culture medium, about 20 gm/liter of activated alumina is stirred into the medium to adsorb such fraction. The slurried mixture is then vacuum filtered requiring about 1 ½ hrs/liter with the described apparatus and occluded solution is washed utilizing 500 ml of distilled water acidified with 1 ml/liter of glacial acetic acid beginning concurrently with the filtering of the last portions of the medium to minimize contact with air. The mixed effluent culture medium and wash solution filtrates are removed with rinsing from the filter flask to provide a filtrate solution fraction from which various other products can be obtained while the separated gonadotropic fraction remains on the filter. As a very important purification operation washing of the filter bed is continued with about 1 liter more of acidified wash water and 50 ml of effluent is then tested for protein content by adding 100 ml of acetone. If a precipitate is formed washing is continued until a negative test is obtained requiring usually about 1 liter more of wash solution. As a result of the foregoing operation a purified gonadatropic fraction remains on the filter bed.

3. Recovery of the purified chorionic gonadotropin from the filter cake is accomplished by an elution procedure. The filter cake is removed from the filter funnel together with filter acid and filter paper and placed in a mixing chamber such as a blender type apparatus. 150 ml of 2N $NH_4OH$ is added and the filter cake is thoroughly dispersed or homogenized therein to assure thorough contact and complete elution of the desired product. The homogenate is filtered by means of a filter bed of the character described with at least one recycle and including rinses of the blender. Residual solution may be rinsed from the filter with distilled water (100 ml) which is added to the ammonia solution filtrate.

4. The gonadotropic fraction is recovered from the ammonia filtrate by acidification to pH 4.5 with acetic acid (glacial) and by addition of 2 volumes of acetone to each volume of filtrate to effect precipitation. The solution is stored at about 5° C for 48 hours to assure complete precipitation and then the mixture is centrifuged. Supernatant is withdrawn and the precipitate is washed from the centrifuge bottle with a minimum amount of water (15-25 ml).

5. The precipitate is again dissolved in 150 ml of 2N $NH_4OH$ with agitation and slow addition of the ammonia, repreceipitated with addition of glacial acetic acid and acetone, recentrifuged and removed from the centrifuge tube as above.

6. The final product is obtained from the residual slurry obtained in operations 4 or 5 utilizing minor purification with standarization and final preparation as follows:

Residual salts, e.g., sodium, are removed by dialysis and the dialysate is agitated and an aliquot (5 ml) is withdrawn and dried by lyophilization and the residue weighed to indicate solids content per ml. The solids are assayed biologically to determined unit weight biological activity (dosage), whenceforth the original dialysate may be diluted with water to provide a standardized dosage or unit of biological activity. Lactose is added to provide 100 mg per 5 ml of diluted dialysate together with 18 mg of $Na_2HPO_4$ as a buffering agent. For final packaging, 5 ml of the solution is apportioned into 10 ml vials, moisture is removed by lyophilization and the vial is capped aseptically. The product is administered paranterally.

The liquid filtrate solution obtained from separation of the gonadotropic fraction is treated for the recovery of steroid hormones in accordance with the following general and exemplary procedure as follows:

1. Ether (diethyl) in a suitable ratio such as 300 ml/1,000 ml of filtrate is employed to extract a fatty fraction containing the steroids from the filtrate.

2. The ether extract is then contacted with 50 ml 0.1N alcoholic KOH for about 1 hour at 78° C to saponify various fatty acid esters present therein. Soaps are removed from the saponified extract by repeated extraction with distilled water with three such extractions being ordinarily sufficient. Subsequently the purified extract is evaporated utilizing a stream of nitrogen while heating on a steam bath to avoid excess heating.

3. The ether extract material may then be fractionated by passage through a 97 percent activated alumina chromatographic column utilizing an elutriant comprising 3 percent ether in cyclohexane. The individual components may be identified as the chromatographic fractions emerge from the column utilizing ultra violet spectrophotometry and effluent elutriant fractions containing separated components are collected. The separated components are collected as solids by evaporating the elutriant and assay is done by conventional biological assay methods whereby dosages may be determined and formulated as above.

A composite placental extract containing a variety of known and many unidentified or characterized physiologically active substances is prepared from the ether extracted filtrate. The materials known to be present are alkaline phosphatase, ribonuclease, adenosinetriphosphate, cholinesterase, and desoxyribonuclease. In view of the unidentified components as well as the known agents, the extract should be highly useful in stimulating research as well as for general curative properties.

1. The ether extracted filtrate is subjected to vacuum to remove residual ether, e.g., by disposition in a suction flask with a vacuum applied for 4 hours.

2. Subsequent to ether removal the solution is neutralized to pH 7.8 with a base such as NaOH.

3. Alternatively, the saponification purification procedure may be replaced by a chromatographic separation wherein the steroids are adsorbed on a 100 percent activated alumina column. Impurities including fatty acid esters are removed by washing the adsorbate with 100 percent cyclohexane. Finally the purified steroid hormones are chromatographically eluted as above with a 3 percent ether in cyclohexane solution.

4. The neutralized solution is then lyophilized to dryness and is powdered whenceforth it is suitable for further processing or for use unmodified for medicinal compounding or for use in research purposes.

What is claimed is:

1. In a process for producing physiologically active substances, the steps comprising culturing viable placenta tissue in a culture medium at a temperature suitable to maintain viability and for a time period sufficient to provide an appreciable concentration of said substances in the culture medium, separating the culture medium containing said substances from said viable tissue, cooling the separated culture medium to about 5° C and acidifying the medium to a pH of about 3.5 to precipitate a glycoprotein fraction containing gonadotropin therefrom, separating the glycoprotein fraction containing the gonadotropin from the solution, contacting the residual culture medium with ether to extract fatty acids and steroid hormones therefrom, separating the ether phase from the culture medium phase, separating the fatty acids from said ether phase, and drying said ether phase to produce a residue including said steroid hormones.

2. The process of claim 1 wherein said fatty acids are separated from said ether phase by contacting said fatty acid extract with alcoholic KOH to saponify fatty acid esters therein, said saponified fatty acids are removed from the extract by contact with a water phase to purify the extract phase, and said extract phase is evaporated to yield a purified steroid hormone solid fraction.

3. The process of claim 1, wherein said fatty acids are separated from said ether phase by contacting said fatty acid extract with alcoholic KOH to saponify fatty acid esters therein, said saponified fatty acids are removed from the extract by contact with a water phase to purify the extract phase, said extract phase is evaporated to yield a purified steroid hormone solid fraction, fractionating said solid fraction in an activated alumina chromatographic column with an elutriant of 3 percent ether in cyclohexane to yield elutriant fractions containing separated steroid hormones, and evaporating elutriant from said fractions to produce separated steroid hormone solids.

4. The process of claim 1 wherein the fatty acids are separated from said ether phase by adsorbing the materials of said fatty acid extract on a 100 percent activated alumina column, said column is washed with cyclohexane to remove impurities, and an elutriant agent of 3 percent ether in cyclohexane is passed through said column to chromatographically elute and separate steroid hormone fractions from said column.

* * * * *